Nov. 26, 1963

D. G. JERORE 3,112,104

UNIVERSALLY ADJUSTABLE WORK HOLDER

Filed Aug. 15, 1961

INVENTOR.
Daniel G. Jerone.
BY
Fearman Fearman McCulloch
ATTORNEYS

United States Patent Office 3,112,104
Patented Nov. 26, 1963

3,112,104
UNIVERSALLY ADJUSTABLE WORK HOLDER
Daniel G. Jerore, 1105 Stanton St., Bay City, Mich.
Filed Aug. 15, 1961, Ser. No. 131,673
4 Claims. (Cl. 269—75)

This invention relates to a universally adjustable clamp for supporting and positioning small parts for welding, brazing or soldering or otherwise working fine parts for a multiplicity of purposes.

One of the prime objects of the invention is to design an adjustable clamp, designed to hold small parts in the most advantageous position for welding, soldering, etc., the parts of the clamp being universally adjustable upon manipulation, to any infinite number of relative positions so that the work to be performed can be easily, quickly and economically accomplished and in a minimum length of time.

Another object of the invention is to design an adjustable clamp, capable of pivotal, rotative, vertical and angularly adjustment both vertically and horizontally to suit any and all conditions.

A further object is to provide an adjustable clamp assembly, the parts of which are resiliently held in adjusted position, and which is capable of oscillatory as well as rotative movement and in which accessibility to the work in almost any desired position is made possible, without resetting or removing same from the clamp or work holding means.

A still further object is to provide a clamp composed of a minimum number of standard parts all of which can be readily manufactured and assembled which is light in weight, compact in size and of neat and pleasing appearance.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and details of construction, without departing from the spirit, or sacrificing any of the advantages of the invention.

Figure 2:
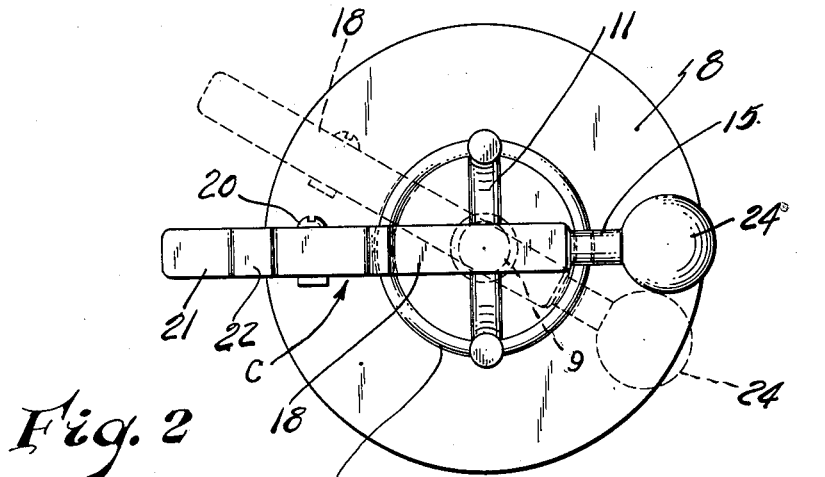
FIG. 2 is a top plan view of the work clamp shown in FIG. 1, the broken lines illustrating circumferential adjustment of the clamp assembly on the ring.

Referring now more specifically to the drawing in which I have shown the preferred embodiment of my invention.

The numeral 8 indicates a preferably flat base plate on which a centrally disposed, vertical post 9 is secured in any desired manner. A transversely disposed opening 10 being provided adjacent the upper end of said post, and a semi-circular saddle link 11 is adjustably mounted therein, this opening 10 being of the same curvature as the radius of the saddle 11, and a coil spring 12 is mounted on the post 9 and is interposed between the base 8 and the saddle 11; said spring bearing against the saddle 11 to hold it in adjusted position.

A horizontally disposed ring 14 is rigidly mounted on the ends of the saddle member 11, and the main leg 15 of a work clamp C is mounted on said ring, said leg being provided with circumferentially spaced apart openings 16 adapted to accommodate the ring 14, to permit the leg 15 to be circumferentially adjusted on said ring and a compressed spring member 17 is mounted on the leg 15, as shown; said spring spanning the ring and bearing against the inner face thereof to hold said main leg in its various circumferentially adjusted positions.

An upper leg 18 cooperates with the clamp leg 15 and is formed with depending ears 19, and a bolt member 20 extends through said leg and ears for pivotally connecting the jaws together, the outer end of the legs 15 and 18 being flatted as at 21, while the upper leg is bent downwardly at 22 to bring the jaws into intimate facial contact. A spring 23 is interposed between the legs 15 and 18 and tends to force the jaws to closed position. A ball-shaped counterbalance 24 is provided on one end of leg 15 opposite the jaws 21, and this counterbalance also forms a handle to swing the jaws and circumferentially adjust the jaw assembly on ring 14, all as shown in broken lines of FIG. 2 of the drawing.

Figure 1:
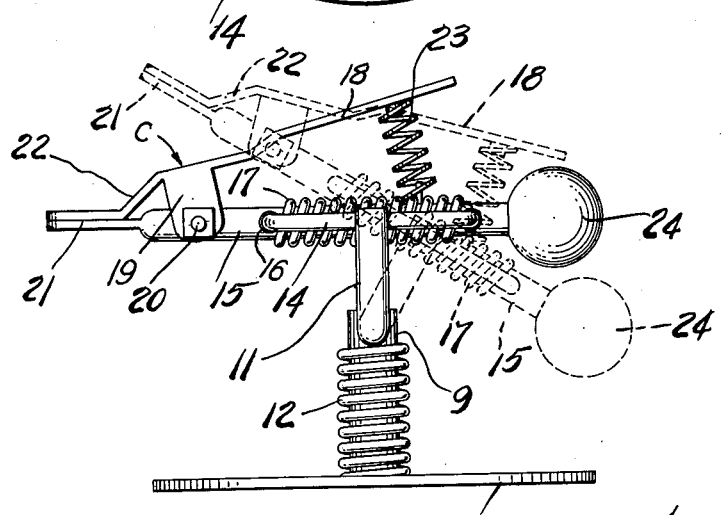
FIG. 1 is a side elevational view of my adjustable work holding means, the broken lines illustrating the adjustment of the saddle member and clamp assembly.
Figure 3:
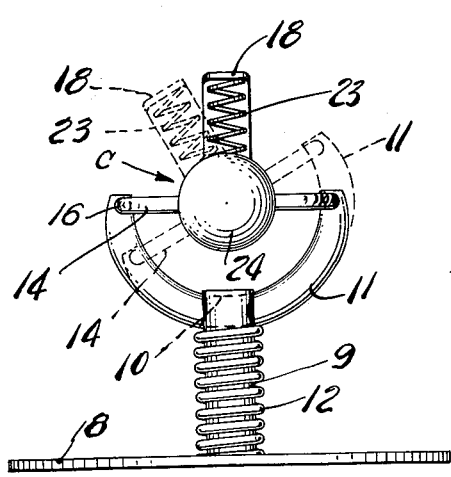
FIG. 3 is a rear elevational view, the broken lines illustrating the sliding adjustment of the saddle and clamp assembly.

With further reefrence to FIG. 1 of the drawing, it will be observed that the saddle with the jaw assembly is rockably mounted on the post 9 and can be swung upwardly or downwardly (see broken lines), to position best suited to enable the operator to perform his work. Then, too, the clamp assembly is circumferentially adjustable on the ring 14 as shown in FIG. 2, and in addition, the jaw assembly can be tilted edgewise in either direction by adjusting the saddle member 11 in the opening 10 of the vertical post, see broken lines in FIG. 3 of the drawing, all of these adjustments, together with combinations thereof, can be easily and quickly accomplished so that any desired position of the part to be welded, soldered or othewise worked on can be readily made.

What I claim is:

1. In a device of the class described comprising, a base, a vertically disposed post mounted thereon; a transversely disposed saddle rockably mounted on said post and slidably adjustable laterally through an arc of substantially 180° with relation thereto; spring means on said post and interposed between said base and saddle to hold the saddle in adjusted positions, and a clamp assembly supported by said saddle and adjustable revolvably with relation thereto.

2. The combination set forth in claim 1 in which a horizontally disposed ring is rigidly mounted on the upper ends of said saddle above said post, with the clamp assembly mounted thereon, said assembly being circumferentially adjustable on said ring.

3. The combination defined in claim 2 in which the clamp assembly includes a lower horizotnally disposed, elongated leg mounted for circumferential movement on said ring, and resilient means on said leg and bearing against diametrically opposed sections of the ring to hold the clamp assembly in adjusted position.

4. In an adjustable, work clamping device comprising, a base; a vertical post mounted on said base; a saddle member rockably mounted on said post and slidably adjustable laterally with relation thereto; a horizontally disposed ring rigidly mounted on said saddle and adjustable therewith; a clamp assembly mounted on said ring and including a horizontally disposed non-rotatable lower leg circumferentially adjustable on said ring; a counter weight on one end of the leg; a jaw on the opposite end; an upper leg pivotally connected to the lower leg and having a jaw, means for resiliently urging the jaw of the upper leg into engagement with the jaw of the lower leg, and resilient means on said vertical post and lower leg respectively for holding the members in adjusted positions.

References Cited in the file of this patent

UNITED STATES PATENTS

| | | |
|---|---|---|
| 1,192,267 | Bond | July 25, 1916 |
| 1,305,321 | Tooker | June 3, 1919 |
| 2,260,995 | Kruczek | Oct. 28, 1941 |
| 2,447,562 | Burri | Aug. 24, 1948 |